Patented Jan. 12, 1937

2,067,862

UNITED STATES PATENT OFFICE 2,067,862

SYNTHETIC RESIN AND METHOD OF PRODUCING

Alfred L. Rummelsburg, Wilmington, Del., assignor to Hercules Powder Company, Wilmington, Del., a corporation of Delaware No Drawing. Application December 1, 1934, Serial No. 755,633

7 Claims. (Cl. 260—8)

This invention relates to an improvement in synthetic resins and method of producing. More particularly, this invention relates to synthetic resins variously adaptable for use in the commercial arts, as, for example, in lacquers, varnishes, as thermoplastics, in films, etc.

Generally speaking, the synthetic resins in accordance with this invention are of the type known as alkyd resins, and more particularly of the modified alkyd type formed by the reaction of a polyhydric alcohol, an organic polybasic acid or anhydride and a monohydric alcohol.

Heretofore it has been known to produce synthetic resins by reacting a polyhydric alcohol, as glycerine, an organic polybasic anhydride, as phthalic anhydride, and a monohydric alcohol, as amyl, butyl, etc. alcohols, or a terpene alcohol, as borneol. Such is disclosed, for example, by U. S. Patents No. 1,921,756, to Kienle, and No. 1,938,791 to Arsen, and the product comprises the alcohols combined with the acid or anhydride.

Again, similar resins have been produced by the reaction of a polyhydric alcohol, an organic polybasic acid or anhydride and a terpene compound containing hydroxyl groups, as disclosed, for example, by U. S. Patent No. 1,904,565, to Adams.

Now, in accordance with this invention, it has been found that synthetic resins having superior characteristics over those heretofore known can be produced by reacting a polyhydric alcohol, a polybasic acid and an alcohol derived from resin acid.

The synthetic resins in accordance with this invention will have superiority in that they may be prepared in the form of solid, high melting bodies of low acid number and high oil solubility, rendering them highly desirable for use in varnish films and in conjunction with nitrocellulose, as a resinous plasticizer, in lacquers, as compared with the liquid form and relatively high acid number of prior similar resins. Again, the procedure embodying the method of this invention finds great advantage from the fact that high temperatures may be avoided in the carrying out of the reaction with consequent avoidance of excess polymerization and resultant oil insolubility.

In the practical adaptation of this invention for the production of synthetic resin in accordance therewith, any well known polyhydric alcohol, such, for example, as glycerine, a glycol, sorbitol, pentaerythrital, etc., or mixtures thereof, may be used. Likewise, any well known organic polybasic acid or anhydride, such, for example, as phthalic anhydride, maleic anhydride, oxalic acid, maleic acid, sebacic acid, adipic acid, succinic acid, etc., or such compound having acid or anhydride characteristics, as the reaction product of terpinene and maleic anhydride, pinene-maleic anhydride and butadiene-maleic anhydride, the reaction product of abietic acid or rosin and maleic anhydride, the reaction product of maleic anhydride and a glycerol or a methyl alcohol ester of abietic acid or rosin, etc., which I contemplate as organic polybasic acids or anhydrides within the scope of this invention, may be used.

Any alcohol derived from a resin acid may be used. For example, abietyl alcohol, $C_{19}H_{29}CH_2OH$, derived from the resin acid abietic acid $C_{19}H_{29}COOH$, hydrogenated abietyl alcohol, $C_{19}H_{31}CH_2OH$, $C_{19}H_{33}CH_2OH$, or mixtures thereof, or pimarol, the resin alcohol $C_{19}H_{29}CH_2OH$ derived from the resin pimaric acid $C_{19}H_{29}COOH$, hydrogenated pimarol, $C_{19}H_{31}CH_2OH$, etc. or mixtures thereof, may be used. Generally speaking, the use of abietyl alcohol or a hydrogenated abietyl alcohol will be preferable, and preferably the resin alcohol will comprise a technical alcohol containing from 85%–95% alcohol and 15%–5% neutral bodies, though it may be more or less concentrated. In the case of hydrogenated abietyl alcohol the unsaturated bonds may be saturated to any extent desirable, from 5–10% to 100%. The most preferable extent of saturation will be found to be from 50% to 100%. It will be understood that the expression of a preference is not intended to be limiting upon the scope of this invention, since the use of resin alcohols generally is indicated and contemplated.

In proceeding for the production of resins in accordance with this invention, the polyhydric alcohol, organic polybasic acid or anhydride and the alcohol derived from a resin acid will be reacted together in the presence of heat, either simultaneously, ab initio, or with the addition of the polyhydric alcohol, or of the resin alcohol before the completion of reaction between one of the alcohols and the acid or anhydride. The reaction may be carried out in any well known or suitable apparatus adapted for the purpose. For example, apparatus including a condenser, as an air condenser, and means for heating the reagents, as an oil bath, will be found satisfactory.

The reaction will desirably be carried out in the presence of heat, say, for example, at a temperature of about 125° C. to about 325° C., though it will be understood that any suitable temperature may be used and that particular temperature is not of the essence of this invention. The reagents may be reacted in widely varying proportions, but for desirable efficiency and economy the reagents will be reacted in suitable molecular proportions.

As more specifically illustrative of this invention from both the method and product standpoints and as illustrative of the adaptability of products in accordance herewith for various uses, synthetic resins embodying this invention may be produced in accordance with this invention as shown by the following examples:

Example I

The following mixture in the molecular proportion of 2.1 moles hydrogenated abietyl alcohol, 1.2 moles glycerin, and 3 moles terpinene-maleic anhydride reaction product:

| | |
|---|---|
| Terpinene maleic anhydride | 200 g. |
| Glycerin | 36 g. |
| Hydrogenated abietyl alcohol (87% alcohol) | 208 g. | is heated under an air condenser in an oil bath at 190° C. for 3 hours, 215° C. for 4 hours, and 225° C. for 1.5 hours. The condenser is removed occasionally to allow water formed to pass off. After cooling, the product is a light yellow colored resin having an acid number of 31, and a drop melting point of 101.5° C. The resin is suitable as a resinous plasticizer for nitrocellulose films and is also compatible with petroleum thinners and drying oils, and is therefore suitable for use in varnishes.

Example II

The following mixture in the molecular proportion of 3 moles hydrogenated abietyl alcohol, 1 mole glycerin, and 3 moles terpinene-maleic anhydride reaction product:

| | |
|---|---|
| Terpinene maleic anhydride | 109 g. |
| Hydrogenated abietyl alcohol (92% alcohol) | 157 g. |
| Glycerin | 15.3 g. | is heated under an air condenser for 3 hours at 175° C.–185° C., 5 hours at 210° C.–220° C., and 5 hours at 220° C.–230° C. in an oil bath. The condenser is removed occasionally to allow water of reaction to pass off. After cooling the product is found to be a light yellow colored resin having an acid number of 71.6 and a drop melting point of 111° C. The resin is suitable for use as a resin plasticizer in nitrocellulose films. Also, since it is compatible with petroleum thinners and drying oils, it is suitable for use as a varnish resin.

Example III

The following mixture in the molecular proportions of 1 mole hydrogenated abietyl alcohol, 1 mole glycerine and 2 moles terpinene-maleic anhydride:

| | |
|---|---|
| Terpinene maleic anhydride | 109 g |
| Hydrogenated abietyl alcohol (87% alcohol) | 79 g. |
| Glycerin | 23 g. | was heated in an oil bath under an air condenser for 3 hours at 175° C.–185° C., 3.5 hours at 210° C.–220° C., and 6 hours at 220° C. to 230° C. After cooling, the light yellow colored resin had a drop melting point of 124° C. and an acid number of 37.0. The product is suitable for use as a resin and resin plasticizer in nitrocellulose films.

Example IV

The following mixture in the molecular proportions of 3 moles phthalic anhydride, 3 moles hydrogenated abietyl alcohol, and 1 mole glycerine:

| | |
|---|---|
| Phthalic anhydride | 74 g. |
| Hydrogenated abietyl alcohol (92% alcohol) | 157 g. |
| Glycerine | 15.3 g. | is heated for 3 hours at 175° C.–185° C., 3.5 hours at 210° C.–220° C. and 6 hours at 220° C.–230° C. in an oil bath under an air condenser. The condenser is removed occasionally to allow removal of water formed. 1 g. phthalic anhydride is added during the last 3 hours heating to take care of any sublimation. The mixture is blown for 1 hour with $CO_2$. On cooling, the light colored solid resin had a drop melting point of 91.5° C. and an acid number of 20. The product is suitable for use as a resin plasticizer in nitrocellulose lacquers.

Example V

The following mixture in the molecular proportions of 3 moles phthalic anhydride, 4 moles hydrogenated abietyl alcohol and 2/3 mole glycerol:

| | |
|---|---|
| Phthalic anhydride | 100 g. |
| Hydrogenated abietyl alcohol (85% alcohol) | 308 g. |
| Glycerine | 14 g. | is heated for 3 hours at 180° C., 9 hours at 210° C.–220° C. in an oil bath under an air condenser. The condenser is removed occasionally to allow water formed to pass off. The product is a light colored resin having an acid number of 19.3 and a drop melting point of 81° C. The acidity can be reduced, if desired, by blowing the material with $CO_2$ while molten. The product is suitable for use in lacquers and varnishes.

Example VI

The following mixture in the molecular proportions of 3 moles sebacic acid, 3 moles hydrogenated abietyl alcohol and 1 mole glycerine:

| | |
|---|---|
| Sebacic acid | 100 g. |
| Hydrogenated abietyl alcohol | 170 g. |
| Glycerine | 15 g. | is heated at 180° C. for 3 hours and at 210° C.–220° C. for 9 hours under a condenser. The condenser is removed occasionally to allow water formed to pass off. The product formed is a light colored, viscous resin having an acid number of 12.8 and a drop melting point of 33° C. The product is suitable as a plasticizer-resin for nitrocellulose films.

With reference to the above examples, it will be understood that they are not contemplated as in any wise limiting either with respect to procedure or with respect to characteristics of the product in accordance herewith, it being noted that the procedure is susceptible of wide modification with respect to time of addition of one or the other of the alcohols, proportions of the reagents, temperature, time of heating, etc. for the production of products having widely different characteristics with respect to melting point or softening, solubility in solvents, acid number, etc.

The synthetic resins in accordance with this invention will find wide use in the commercial arts. Thus, by way of illustration, they will be, for example, generally soluble in, for example, the usual lacquer solvents and will act to plasticize nitrocellulose and hence will be desirable ingredients for use in lacquers. Again, they will be soluble in oils and of a solid character and hence will variously be desirable ingredients for use in varnishes. Obviously, they will be adaptable for various other uses for which resinous substances having the characteristics indicated will be indicated or found desirable.

As more specifically illustrative of the usefulness of the resins in accordance with this invention, for example, an efficient varnish including a synthetic resin in accordance with this invention may be made up, for example, as follows:

A mixture of 25 parts resin and 85 parts China wood oil is heated quickly to 280° C. when 25 additional parts of resin are added with stirring. The mass is cooled to 225° C. and reduced with 50 parts steam-distilled wood turpentine and 125 parts of petroleum thinner. The resultant varnish is light colored, clear, and dries to tough films. It may be noted that this formulation in no way limits the use of the resin in varnishes. Widely divergent proportions may be used. Other drying oils and solvents may be used, and the conditions varied to give varnishes of divergent properties.

Again, an efficient lacquer, including a synthetic resin, in accordance with this invention, produced, for example, according to Example No. I above, may be made up, for example, as follows:

Five parts of ½ second nitrocellulose, 4 parts resin, 2 parts dibutyl phthalate and 39 parts solvent, consisting of 40% butyl acetate and 60% toluene are thoroughly mixed. A clear lacquer may be obtained which when cast into films dries to give clear, tough surfaces. It is again pointed out that the above formulation in no way limits the use of the resin in lacquers. The formulation may be widely varied depending upon the type of lacquer desired.

It will now be understood that this invention broadly involves synthetic resins produced by the reaction of a polyhydric alcohol, an organic polybasic acid and an alcohol derived from a resin acid, that this invention further variously involves particular procedure as disclosed herein.

It will be understood that it is not contemplated that the scope of this invention shall be in any way limited by detail and exemplification of the invention given herein, such being given merely by way of illustration for a full understanding of the invention, it being noted that various wide modification in detail may be made without departing from the scope of the invention.

What I claim and desire to protect by Letters Patent is:

1. The reaction product of a polyhydric alcohol, an organic polybasic acid or anhydride and a hydrogenated abietyl alcohol.

2. The method of producing a synthetic resin which includes reacting a polyhydric alcohol, an organic polybasic acid and a hydrogenated abietyl alcohol.

3. The reaction product of a polyhydric alcohol, an organic dibasic acid or anhydride and a hydrogenated abietyl alcohol.

4. The reaction product of a polyhydric alcohol, an organic polybasic acid or anhydride and a hydrogenated abietyl alcohol having a hydrogen saturation of at least 50%.

5. The reaction product of glycerin, an organic polybasic acid or anhydride and a hydrogenated abietyl alcohol.

6. The reaction product of a polyhydric alcohol, phthalic anhydride and a hydrogenated abietyl alcohol.

7. The reaction product of a polyhydric alcohol, maleic anhydride and hydrogenated abietyl alcohol.

ALFRED L. RUMMELSBURG.